3,175,899
METHOD FOR OPERATING STEEL WORKS WHEREIN OXYGEN OR AIR ENRICHED WITH OXYGEN IS USED AS A REFINING MEANS
Roland Kemmetmüller, Plosslgasse 3, Vienna, Austria
Filed Dec. 4, 1961, Ser. No. 156,730
Claims priority, application Japan, Dec. 6, 1960, 47,439/60; Austria, Mar. 30, 1961, A 2,621/61
5 Claims. (Cl. 75—60)

Blast steel methods, as for instance the so-called LD-method of the LD-AC method wherein oxygen from above is blown on the steel smelt in the converter, are generally known today. Besides, today in nearly all the other methods for producing steel, as for instance the open-hearth method, the Thomas method and so on, technically pure oxygen or air enriched with oxygen are used as a refining means. The amount of oxygen required therein mostly is rather large; for instance, in the LD-method it amounts to about 55 to 60 Nm.$^3$ for each ton of steel, in some cases to about 70 Nm.$^3$ for each ton of steel.

From all the methods for producing steel, waste gases result having very high temperatures and high contents of dust, too. For effectively removing the dust from the waste gases, and for regaining thereby valuable iron oxides, the waste gases must be cooled correspondingly. For this purpose various devices have been constructed, as for instance waste heat boilers, water cooled flues, or direct water injection and the like. Plants with water cooled flues or direct water injection require a large amount of cooling medium and their operation is uneconomical as the amounts of heat contained in the waste gases cannot be used for producing energy. Only cooling by waste heat boilers allows a recuperation by the amount of steam produced which can be used for producing power or for various other purposes in the steel works.

On the other hand large amounts of energy are used for producing the oxygen required in the steel works. The 55 to 60 Nm.$^3$ of oxygen required in the LD-method for each ton of steel correspond to power requirements for the oxygen-production of about 42 to 50 kwh. for each ton of steel. Further, these oxygen works require large amounts of cooling medium for the compressors for oxygen and air. An oxygen plant for an LD-steel works having a steel production of 200 tons of steel per hour thus requires energy of 8,500 to 10,000 kwh. and 900 to 1,000 m.$^3$ cooling water per hour. If little cooling water is available expensive devices are required for recooling the same, said devices requiring further electrical energy in the plant.

By the method according to the invention the economy of steel works operated with oxygen can be raised considerably. The inventive method provides that the hot waste gases resulting from the steel production are cooled in a waste heat boiler in a manner known per se and that the steam thus produced is directly used for driving the compressors for air and oxygen, the feeding water required for producing steam being passed as a cooling medium to the compressors of air and oxygen and being heated thereby. This method has the advantage that by the direct use of the steam produced with the help of the waste heat for driving the machines of the oxygen work, all electrical losses can be avoided, too. Further, the heat of compression of the compressors for oxygen and air is used for preheating the feeding water for the waste heat boiler and thus is utilized profitably. This heat of compression thus utilized corresponds to about 13.5% of the driving energy required for producing oxygen, or about 5.7 to 6.7 kwh. for each ton of steel. By using the feeding water for cooling purposes also a large amount of cooling water can be saved.

By reckoning it has been found out that the vapour produced from the converter gases in the waste heat boiler is nearly sufficient to provide the entire driving energy of the oxygen work as well as the energy required for all the electrically driven devices in the steel works, inclusive of the energy required in the rolling mill. For compensation of the steam peaks delivered by the converter gases it is useful in most cases to burn an additional fuel in the waste heat boiler and, therefore, it is easily possible to gain the complete driving energy for the entire oxygen works and steel works by means of the waste heat boiler. Depending on the kind of steel process, and the analysis of the crude iron, 350 to 400 kg. saturated steam per ton of steel are produced in the waste heat boiler. If this saturated steam is converted into super-heated steam in external super-heaters this will correspond to a steam turbine output of about 90 to 100 kwh. for each ton of steel, depending on the quality of the steam turbine and condensation. For the oxygen works 42 to 50 kwh. per ton of steel are required. Considering the inventive recovery of 13.5% of the compression heat for the purpose of preheating the feeding water, an amount of energy of about 54 to 57 kwh. per ton of steel remains for the rolling mill and the other requirements of the steel works. This structural solution has the special advantage that in the case of high steel production there is produced much steam and therewith much energy, whereas in the case of small steel production correspondingly less steam and energy result. Thereby the steel works, inclusive of the oxygen works are completely independent in their energy supply and no longer burden the other supply of energy of the iron works.

The invention will now be explained with reference to the appended drawing, in which.

Figure 1:
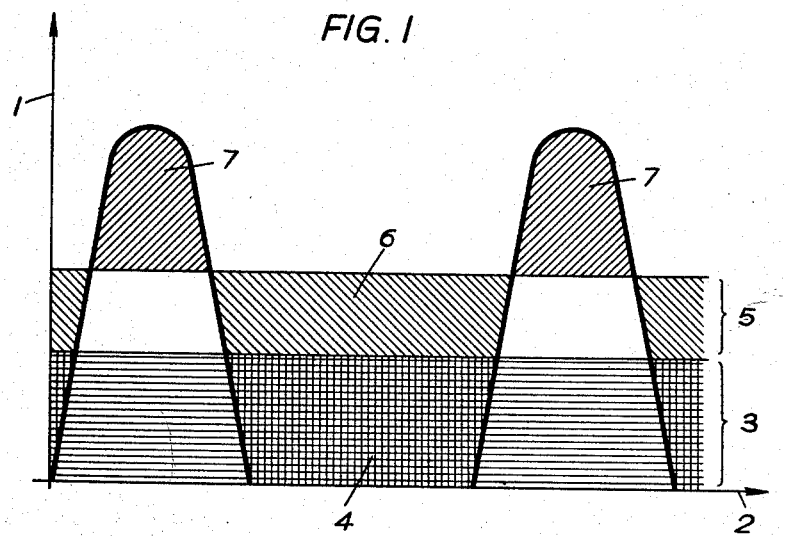
FIG. 1 shows a steam diagram applicable to waste heat boilers in the operation of LD-steel works, and in which the steam peak is shown, for purposes of compensation, as being passed to a high-pressure steam reservoir and wherein, in accordance with the inventive concept, high-, medium- and low-pressure steam are shown to be available.

In FIG. 1 the reference numeral 1 indicates the steam ordinate while 2 is the time abscissa of the steam diagram of an LD-steel works. Due to the converter gases being produced unequally during the blast process steam peaks are built up; therebetween lies a period without steam production during the blast interval. For the operation of steam turbines an even and constant steam supply must be assured. According to the inventive method the steam produced in the waste heat boilers above all is to be used for the operation of the compressors for oxygen and air of the oxygen work. Therefore the extraction of a constant flow 3 is provided for immediately behind the waste heat boiler. The crosshatched area 4 lying between both the steam peaks corresponds to a certain amount of steam which for instance can be produced by the operation of an additional heating means in the waste heat boiler during the blast interval. Above this constant high pressure steam flow 3 a likewise steam flow 5 is shown which corresponds to the energy requirement of the remaining part of the steel works inclusive of the rolling mill. There is thus concerned a medium pressure steam or a low pressure steam which is taken from the high pressure gradient reservoir. This reservoir is loaded during the blast period with high pressure steam, steam being supplied at the same time from the waste heat boiler, and during the blast interval delivers an amount of medium pressure steam, or low pressure steam, in an amount which corresponds to the area 6. The area 7 of the steam peak therefore must correspond to the area 6 of the steam delivery heat of the blast interval.

Figure 2:
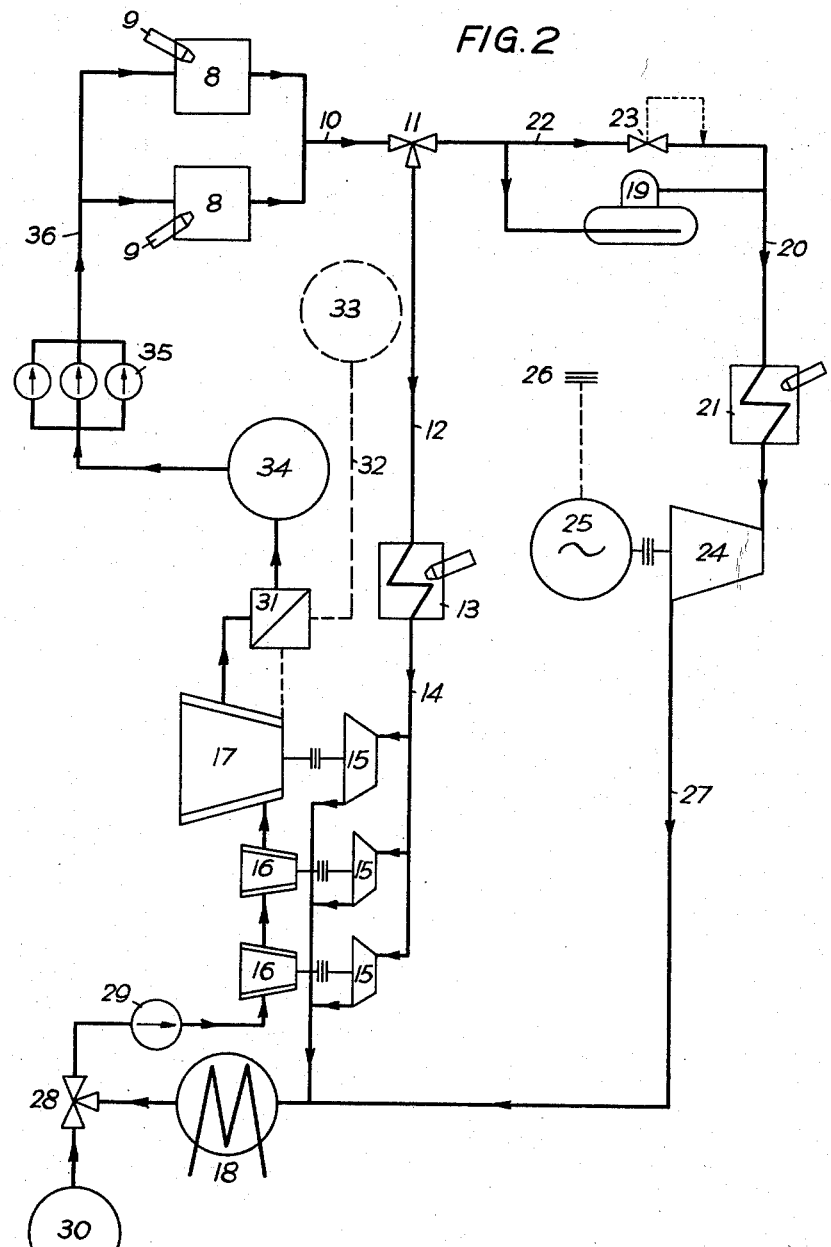
FIG. 2 is a diagrammatic representation of a steel works incorporating the present invention.

The diagram in FIG. 2 shows two waste heat boilers 8 which are operated with converter gases. The gas inlets and outlets are not shown. However, each of the waste heat boilers 8 is provided with an additional heating means 9. The waste heat boilers 8, for instance, operate alternatingly in such a manner that one boiler produces steam during the blast period of the converter assigned to it, while the other waste heat boiler operates during the blast interval of its own assigned converter but only by means of its additional heating means 9. The saturated steam produced by the waste heat boilers is passed to a steam distributing device 11 via a collecting line 10. A part of the high pressure saturated steam is passed from the device 11 through a line 12 to an externally heated superheater 13. The superheated high pressure steam is passed through the line 14 to the steam turbines 15 which, for instance, may be directly coupled with the compressors 16 for oxygen and the compressor 17 for air. The waste steam of the steam turbines 15 is passed to the condenser 18 and is condensed there. The second part of the high-pressure saturated steam from the waste heat boilers 8 is passed from the steam distributing device 11 to the reservoir 19 and therefrom through the medium pressure saturated steam line 20 to the externally heated superheater 21. To avoid passing the entire amount of steam through the steam reservoir 19, an adjjustable amount of steam can be passed through the parallel line 22 and the control valve 23 directly to the steam line 20 and to the external superheater 21. The medium pressure saturated steam is passed, for instance, from the external superheater 21 to a medium pressure turbine 24 driving a generator 25 which supplies its current to the electrical net 26 of the works for providing the entire requirement of electric energy of the steel works. The waste steam of the medium pressure turbine 24 is passed through the condenser line 27 to the condenser 18. It is possible, of course, to provide a separate condenser for the medium pressure turbine immediately beyond the same. The condensate leaving the condenser is passed to the condensate pump 29 through a control device 28; the loss of water is compensated from the feed water container 30. The pump 29 feeds the condensate to the intermediate coolers of the compressors 16 for oxygen and the compressor 17 for air; there the condensate is preheated by the heat of compression. In a subsequent cooler 31 the compressed oxygen again is cooled by means of the condensate and then is passed through the oxygen line 32 to the oxygen pressure container 33 from where it is withdrawn for use in the blast process in the converter. The preheated condensate is passed to a pressure-gas expeller 34 and therefrom is passed through the feeding pumps 35 and the feeding line 36 to the waste heat boilers 8.

Figure 3:
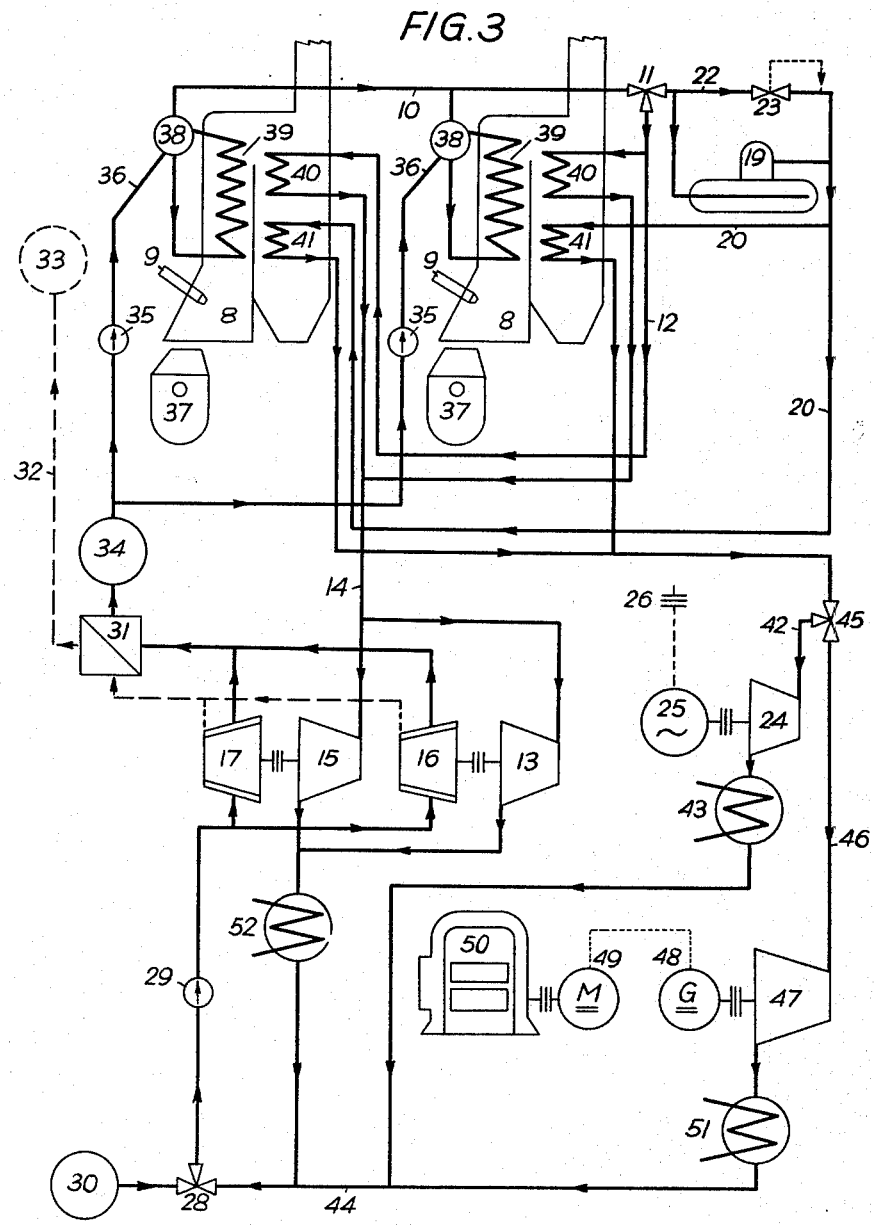
FIG. 3 is a view substantially similar to FIG. 2, but constitutes a modified embodiment of the present invention.

In FIG. 3 a variant of the diagram is shown. The same reference numerals are used as in FIG. 2. Additionally the converters 37 are indicated schematically. The boiler drums are indicated at 38 and the radiation heating areas of the waste heat boilers 8 have the reference numeral 39. The saturated steam product in the waste heat boilers 8 is passed through the control device 11 to the high pressure superheater 40 installed in the second flue of the waste heat boilers 8. The steam superheated therein is passed through the superheated-steam vapour line 14 to the driving turbines 13 and 15 for the air compressors 16 and the oxygen compressors 17 of the oxygen works. The second part of the saturated steam produced in the waste heat boilers 8 is passed through the control valve 11 and the high pressure gradient reservoir 19 as well as the medium-pressure steam line 20 to the medium-pressure superheater 41 which is also installed in the waste heat boilers 8. Through the line 42 the superheated medium pressure steam is passed to the steam turbine 24 driving the generator 25. This generator feeds the energy required by the steel works to the polyphase alternating current net 26. The waste steam from the turbine 24 flows into the condenser 43 and therefrom to the condensate-collecting line 44. A second part of the medium-pressure saturated steam flows through the control valve 45 and the line 46 to the steam turbine 47 driving the direct-current generator 48 of a Ward-Leonard set. The motor 49 of this set drives the schematically shown rolling mill 50. The waste steam of the turbine 47 is also condensed by the condenser 51 and passes into the condensate collecting line 44. The waste steam from the high pressure turbines 13 and 15 is condensed in the condenser 52 and is also passed to the condensate-collecting line 44. In the same manner as shown in FIG. 2 the condensate is pressed through the control valve 28 by means of the pump 29 and into the intermediate coolers of the air compressors and oxygen-compressors 16, 17 and is then passed on through the subsequent cooler 31 and the pressure gas extractor 34 to the feeding pumps 35.

Figure 4:
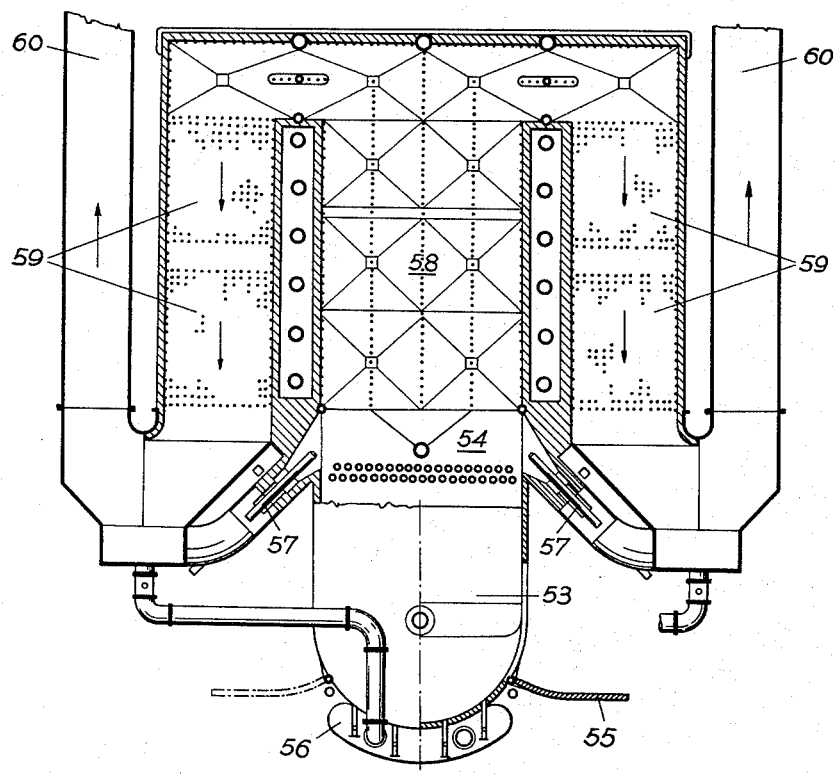
FIG. 4 is a top plan view, partly in section, of a waste-heat boiler incorporating the present invention.
Figure 5:
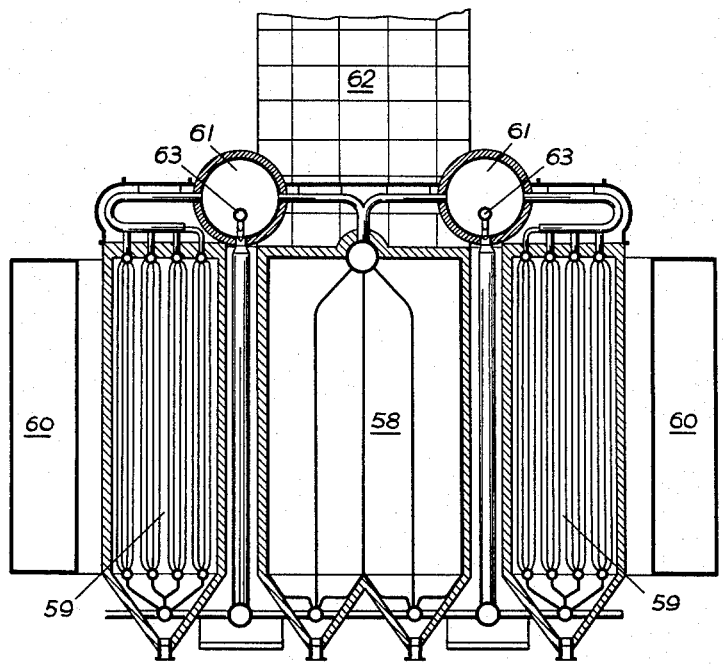
FIG. 5 is an elevational view, partly in section, of the boiler illustrated in FIG. 4.

In the FIGURES 4 and 5 a waste-heat boiler for carrying out the method according to the invention is shown by way of example. FIG. 4 shows a horizontal section and FIG. 5 a cross section through this boiler. A horizontally arranged boiler is shown with its hood 53 arranged above the converter. A number of depending slag-catching tubes 54 serve to receive the crude slag ejected from the converter. Further, there are shown two doors 55 on the left and on the right of the converter hood 53; said doors make the converter easily accessible for brick lining. A secondary-air inlet 56 favors the turbulence and the safe ignition of the converter waste gases. On the left and on the right additional burners 57 are arranged and allow the steam production to be maintained even during the blast intervals of the converter. One flue of this waste heat boiler consists substantially of the radiation heating surfaces 58. At the end of this flue the gases are deflected to both sides and another flue is formed which is twofold and symmetrically arranged to the first flue. This second flue comprises the contact-heating surfaces 59. There follows again a deflection of the flue gases by 180°. Through the channels 60 the flue gases are then passed to the chimney. Also to be seen in the cross-sectional drawing of the boiler are the symmetrically arranged boiler drums 61, the emergency stack 62, and the feeding-in device 63 located in the boiler drum 61.

I claim:

1. In a method for refining metals in which compressed gas is used and in which hot waste gas is produced, the steps of heating a waste gas steam boiler by the hot waste gas produced in the refining process so as to use the heat energy of the hot waste gas for steam production; feeding the steam produced in the waste gas steam boiler into a prime mover for driving the same and driving compressors for production of compressed gas used in the refining process directly by said prime mover; cooling the compressors and the compressed gas produced therein with cooling water, thereby heating the latter; and feeding the thus heated water into the waste gas steam boiler for subsequent transportation into steam.

2. In a method for refining metals in which compressed gas is intermittently used and in which hot waste gas is intermittently produced, the steps of heating a waste gas steam boiler by the hot waste gas produced in the refining process so as to use the heat energy of the hot waste gas for steam production; feeding the steam produced in the waste steam boiler to steam operated prime movers for driving the same and driving compressors for the production of the compressed gas used in the refining process directly by said prime movers; condensing the steam after it has passed the prime movers; using the condensate for cooling the compressors and the compressed gas produced therewith, thereby heating the condensate; and feeding the heated condensate into the waste gas steam boiler for subsequent transformation into steam.

3. In a method for refining metals in which compressed gas is intermittently used and in which hot waste gas is intermittently produced, the steps of heating a waste gas steam boiler by the hot waste gas produced in the refining process so as to use the heat energy of the hot waste gas for steam production; superheating the steam produced in the waste gas steam boiler in superheaters also heated with said hot waste gas; feeding the superheated steam into steam turbines directly coupled with gas compressors for driving the latter to produce compressed gas used in the refining process; condensing the steam after it has passed through said turbines; cooling the compressors and the compressed gas produced therewith with the condensate thus obtained, thereby heating the condensate; and feeding the heated condensate into the waste gas steam boiler for subsequent transformation into steam.

4. In a method using compressed gas, the steps of producing steam in a steam boiler; feeding the steam produced in the steam boiler to drive steam operated prime movers and driving with the latter compressors for producing compressed gas; condensing the steam after it has passed the prime movers; cooling the compressors and the compressed gas produced therewith with the condensate thus obtained, thereby heating the condensate; and feeding the heated condensate into said steam boiler for subsequent transformation into steam.

5. In a steel refining method comprising the steps of intermittently blowing compressed gas into a molten steel bath and thereby intermittently producing hot waste gas; heating a steam boiler by the intermittently produced hot waste gas and thus using the heat energy of the hot waste gas for steam production; heating the steam boiler in the intervals between the intermittent feeding of hot waste gas by additional heating means; feeding a constant amount of steam smaller than the mean amount of steam produced from the heat energy of the hot waste gas and that of the additional heating means from the steam boiler into steam operated prime movers directly coupled with gas compressors for driving the latter for production of compressed gas to be blown into the steel bath; feeding the remaining steam produced in the boiler into a steam reservoir; condensing the steam fed into the prime movers after passing therethrough; cooling the compressors and the compressed gas produced therein with the condensate, thereby heating the latter; feeding the thus heated condensate into said steam boiler for subsequent transformation into steam; and feeding the steam from said steam reservoir to auxiliary apparatus to operate the same.

References Cited by the Examiner
UNITED STATES PATENTS

| 933,596 | 9/09 | Stock | 75—60 |
| 2,258,167 | 10/41 | Turner | 60—63 |
| 2,707,239 | 4/55 | Riehl | 290—2 |
| 2,831,467 | 4/58 | Guczky. | |

BENJAMIN HENKIN, *Primary Examiner.*

RAY K. WINDHAM, *Examiner.*